(12) United States Patent
Liu (10) Patent No.: US 7,666,534 B1
(45) Date of Patent: Feb. 23, 2010

(54) ELECTRO-CATALYTIC OXIDATION DEVICE FOR REMOVING CARBON FROM A FUEL REFORMATE

(75) Inventor: Di-Jia Liu, Naperville, IL (US)

(73) Assignee: The United States of America as Represented by the Untied States Department of Energy, Washington, DC (US)

( * ) Notice: Subject to any disclaimer, the term of this patent is extended or adjusted under 35 U.S.C. 154(b) by 541 days.

(21) Appl. No.: 11/532,928

(22) Filed: Sep. 19, 2006

(51) Int. Cl.
*H01M 8/06* (2006.01)
*C25B 9/06* (2006.01)
(52) U.S. Cl. .................... 429/21; 204/252
(58) Field of Classification Search .......... 205/763, 205/764, 765; 204/252; 429/19, 21
See application file for complete search history.

(56) References Cited

U.S. PATENT DOCUMENTS

| | | | |
|---|---|---|---|
| 5,543,241 A * | 8/1996 | Nishioka et al. | 429/39 |
| 6,245,214 B1 * | 6/2001 | Rehg et al. | 205/764 |
| 6,830,675 B2 * | 12/2004 | Zur Megede | 205/763 |
| 6,893,760 B2 * | 5/2005 | Shibata et al. | 429/30 |

* cited by examiner

*Primary Examiner*—Stephen J. Kalafut
(74) *Attorney, Agent, or Firm*—Michael J. Dobbs; Brian J. Lally; Paul A. Gottlieb (57) ABSTRACT

An electro-catalytic oxidation device (ECOD) for the removal of contaminates, preferably carbonaceous materials, from an influent comprising an ECOD anode, an ECOD cathode, and an ECOD electrolyte. The ECOD anode is at a temperature whereby the contaminate collects on the surface of the ECOD anode as a buildup. The ECOD anode is electrically connected to the ECOD cathode, which consumes the buildup producing electricity and carbon dioxide. The ECOD anode is porous and chemically active to the electro-catalytic oxidation of the contaminate. The ECOD cathode is exposed to oxygen, and made of a material which promotes the electro-chemical reduction of oxygen to oxidized ions. The ECOD electrolyte is non-permeable to gas, electrically insulating and a conductor to oxidized. The ECOD anode is connected to the fuel reformer and the fuel cell. The ECOD electrolyte is between and in ionic contact with the ECOD anode and the ECOD cathode.

20 Claims, 4 Drawing Sheets

ELECTRO-CATALYTIC OXIDATION DEVICE FOR REMOVING CARBON FROM A FUEL REFORMATE

GOVERNMENT INTERESTS

The United States Government has rights in this invention pursuant to Contract No. W-31-109-ENG-38, between the U.S. Department of Energy (DOE) and the University of Chicago.

FIELD OF THE INVENTION

The present invention relates to the removal of carbon from a gas stream. The present invention more preferably relates to the prevention of coke buildup within a fuel cell.

BACKGROUND OF THE INVENTION

Fuel cells have proven to be an important technology in improving energy efficiency. Although a mature technology, recent advancements have spurred fuel cell development for commercial applications. As the debate continues over the future energy supply, there exists a strong interest in improving the efficiency of current fuel sources. The efficient use of current fuels such as gasoline, diesel, or methane through fuel cells can bring fuel cells into the forefront of helping ease the energy crisis.

Generally, fuel cells cannot directly convert liquid hydrocarbon fuels into energy. Instead, liquid fuels, such as gasoline and diesel, need to be first converted by a fuel reformer into hydrogen and carbon monoxide as the fuel gas for fuel cell. The resulting gas (reformate) is fed into the anode of a fuel cell and electrocatalytically converted into water, carbon dioxide, and electricity. Typical methods of reforming include partial oxidation reforming (POX), autothermal reforming (ATR) and steam reforming (SR). Reforming hydrocarbon fuels containing polyaromatic hydrocarbons and sulfur-containing polyaromatics such as those found in commercial diesel is a difficult process. Incomplete reforming causes coke buildup, a solid carbonaceous residue, within the fuel cell due to condensation of unconverted hydrocarbons leaking from the reformer. Coke buildup blocks the reformate from reaching to the anode of the fuel cell, hindering fuel cell performance. See *Fuel Cell Handbook*, 7$^{th}$ ed. National Energy Technology Laboratory, 2004 (DOE/NETL-2004/1206) (OSTI ID: 834188) pg 8-11 2004, herein fully incorporated by reference. Coke buildup is the result of sulfur content in the fuel, the use of a heavy aromatic fuel, or a combination thereof.

Coke buildup is a major problem with solid oxide fuel cells (SOFC), which operate at temperatures especially susceptible to coke buildup. Generally, coke buildup forms downstream from the fuel reformer at the entrance of the SOFC, where the temperature is usually lower than that of the fuel reformer.

As an example, in a fuel cell system utilizing diesel fuel it is common to use an autothermal reformer, and a SOFC. The fuel reformer typically operates in excess of about 600° C., preferably 700-800° C., to process the diesel into a hydrogen rich reformate. Unconverted and fragmented hydrocarbons are generated in the reformer as a byproduct of processing the diesel, as diesel has both high heavy aromatics and sulfur content. When carbon in the reformate reaches the anode of the fuel cell, it cools within the window of carbon condensation (generally in the range about 400° C. to 650° C.), and condenses onto the fuel cell inlet or on the surface of anode, creating a coke buildup. The coke buildup blocks the reformate from reaching the electrocatalyst inside of the fuel cell and stops the electrochemical reaction for generating electricity. As more coke buildup occurs, the fuel cell becomes less efficient at generating electricity.

One method of reducing coke buildup is to increase the operating temperature of the fuel cell, as well as heating any channels between the fuel reformer and the fuel cell. Increasing the temperature of the channels and the fuel cell greatly reduces the energy efficiency of the fuel cell system due to the continuous heating required to maintain the operating temperatures close to 1000° C. Furthermore, as the result of reformate distribution and uneven reaction rate, the fuel cell itself does not normally heat uniformly causing cooler spots, on which coke condenses. These cooler spots with cumulated coke buildup lead to the reduction of the catalytic capacity of the fuel cell until the fuel cell is cleaned.

Another method of removing coke buildup is to disassemble the area of the fuel cell with the coke buildup and physically clean any coke buildup. Disassembly requires the fuel cell to be shutdown, which interrupts the power production. The anode of the fuel cell may also be adversely affected by ambient air exposure during the cleaning process. For example, the commonly used reduced nickel anode in a SOFC oxidizes in ambient air to form nickel oxide, causing thermal and mechanical stress in the fuel cell anode, which eventually destroys the SOFC.

Yet another method of removing coke buildup is flushing the reformate channel and the fuel cell with oxidizing reagents such as oxygen at elevated temperatures. The oxidizing reagent reacts with the coke buildup and forms a carbon dioxide gas, which easily passes through the fuel cell system. Since the oxidizing reagent also reacts with hydrogen, obviously the fuel cell must be shutdown during the cleaning. Furthermore, oxidation of the anode of the fuel cell (commonly reduced nickel) will also occur if the oxidizing reagent reaches the anode, thus poses a risk of destroying SOFC.

Therefore, a need exists to have a fuel cell system that is capable of continual and uninterrupted processing of fuels having heavy aromatics, high sulfur content, or combinations thereof without coke buildup to impair the fuel cell operation.

SUMMARY OF THE INVENTION

A device and method for the removal of a contaminate, such as carbon, from a gas stream. The gas stream is passed through one or more ECOD (electro-catalytic oxidation devices). Each ECOD (electro-catalytic oxidation device) has an ECOD anode, an ECOD cathode, and an ECOD electrolyte. The ECOD anode is made of a material which is porous and chemically active to the electro-catalytic oxidation of the contaminate. The ECOD cathode is made of a material which promotes the electro-chemical reduction of oxygen to oxidized ions. The ECOD electrolyte is made of a material which is non-permeable to gas, electrically insulating and a conductor to oxidized ions. The ECOD electrolyte is positioned between and in ionic contact with the ECOD anode and the ECOD cathode. The ECOD anode is electrically connected to the ECOD cathode through an external circuit. Preferably, the ECOD removes carbonaceous contaminates from a fuel cell system, preventing coke buildup within the fuel cell.

DETAILED DESCRIPTION OF THE INVENTION

Figure 1:
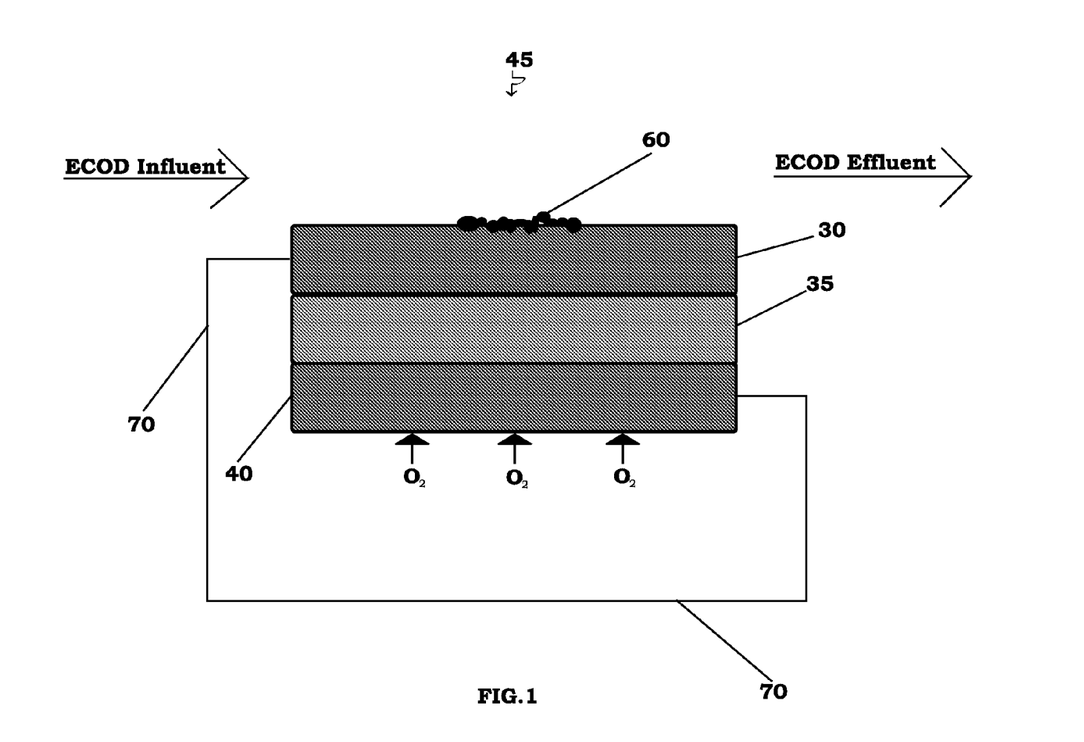
FIG. 1 is a cross-sectional view of one embodiment of the electro-catalytic oxidation device.

A device and method for the removal of contaminates, such as carbon, from a gas stream. The gas stream is passed through one or more ECOD (electro-catalytic oxidation devices). FIG. 1 depicts a side view of an embodiment of an ECOD 45. The ECOD 45 comprises an ECOD anode 30, an ECOD electrolyte 35, an ECOD cathode 40, and a wire 70.

The ECOD electrolyte 35 is positioned between and in ionic contact with the ECOD anode 30 and the ECOD cathode 40. The ECOD electrolyte 35 is preferably directly connected to the ECOD anode 30 and the ECOD cathode 40. In one embodiment, one or more ion conductors are positioned between the electrolyte 35 and the ECOD anode 30, the electrolyte 35 and the cathode 40, or combinations thereof. The wire 70, preferably a low resistance copper wire, electrically connects the ECOD anode 30 and the ECOD cathode 40. An influent is passed along the surface of the ECOD anode 30. Contaminates from the influent will condense on the surface of the ECOD anode 30. Preferably, the contaminates are carbonaceous contaminates which cause a coke buildup 60 on the surface of the ECOD anode 30. The ECOD anode 30 is maintained at a temperature which promotes the formation of the buildup.

For example, in the case of an electrochemical removal of carbonaceous contaminate, in a first reaction, shown in Eq. 1, the cathode 40 will capture four electrons from the surface of the ECOD cathode 40 to form an oxide ion ($O^{-2}$).

$$O_2 + 4\,e^- => 2O^{-2} \quad \text{(Eq. 1)}$$

In a second reaction, shown in Eq. 2, the oxide ion($O^{-2}$) is driven by the electrochemical potential to migrate to the ECOD anode 30 through the electrolyte layer 35, and reacts with the coke buildup 60 on the surface of the ECOD anode 30 creating $CO_2$ and electricity.

$$2O^{-2} + C => CO_2 + 4\,e^- \quad \text{(Eq. 2)}$$

During the second reaction, the coke buildup 60 is consumed. An ECOD effluent is therefore created from the ECOD influent with significantly less components prone to coke formation. Electricity is produced by the electro-oxidation of the coke buildup 60 and dissipated through line loss in the wire 70. Alternatively, the wire 70 may be connected to an energy storage device (not shown) in order to collect any energy generated. The energy storage device may be any device capable of storing electrical energy. The energy storage device is preferably a battery, a super capacitor, or other storage devices performing a similar function. In the alternative, the generated energy may be aggregated to the energy production of the fuel cell.

The ECOD anode 30 is porous and chemically active to the electro-catalytic oxidation of the coke buildup 60. In a preferred embodiment, the ECOD anode 30 is made of nickel supported over gadolinium doped cerium oxide (Ni—CGO). Alternatively, any anode material for solid oxide fuel cells operable at a temperature within the window of carbon condensation (preferably about 400° C. to 650° C.) may be used.

The ECOD anode 30 is operated at a temperature within the window of carbon condensation, preferably about 400° C. to 650° C. Preferably, the ECOD anode 30 is at a temperature between about 500° C. and 600° C. Under such conditions, polycyclic aromatic hydrocarbons (PAH) formed from the polymerization and aromatization of the unsaturated hydrocarbons and aromatics in the ECOD influent will generate a coke buildup 60 on the ECOD anode 30 surface. The ECOD anode 30 temperature may be maintained using various heat and cooling methods. For example, the ECOD anode 30 may be heated by heat from the fuel cell system (e.g. fuel reformer, fuel cell), combustion from fuel cell exhaust, or a combination thereof. The ECOD anode 30 may also be cooled, for example by input air, various water cooling methods, cooling fans, or combinations thereof. In a preferred embodiment, the ECOD influent (reformate), having a temperature as high as about 1000° C., is sufficiently cooled to the desired ECOD anode 30 temperature (between about 500° C. and 600° C.) by heat loss to ambient air. In the alternative, the ECOD anode 30 temperature may also be maintained by a temperature controlled system such as a heat exchanging system utilizing an electric heater, fuel based heater, waste heat from fuel cell exhaust or reformer, fans, air conditioning system, or combinations thereof.

The ECOD electrolyte 35 is non-permeable to the ECOD influent (reformate), electrically insulating and a conductor to oxidized ions at the operating temperature of the ECOD 45. Preferably, the ECOD electrolyte 35 is non-permeable to the ECOD influent (reformate), electrically insulating and a conductor to oxidized ions between about 400° C. and 650° C., more preferably 500° C. and 600° C. In a preferred embodiment, the ECOD electrolyte 35 is gadolinium doped cerium oxide (CGO) or Cerium Oxide.

The ECOD cathode 40 is made of a material which promotes the electrochemical reduction of oxygen to oxide ions at the operating temperature of the ECOD 45. Preferably, the ECOD cathode 40 promotes the electrochemical reduction of oxygen to oxide ions between about 400° C. and 650° C., more preferably 500° C. and 600° C. Preferably, the ECOD cathode 40 is Ag—CGO, $Y_{0.25}Bi_{0.75}O_{1.5}$, or $Sm_{0.5}Sr_{0.5}CoO_{3-\delta}$. In a preferred embodiment, the ECOD cathode 40 is Ag—CGO. The ECOD cathode 40 is exposed to $O_2$, preferably from ambient air.

Figure 2:
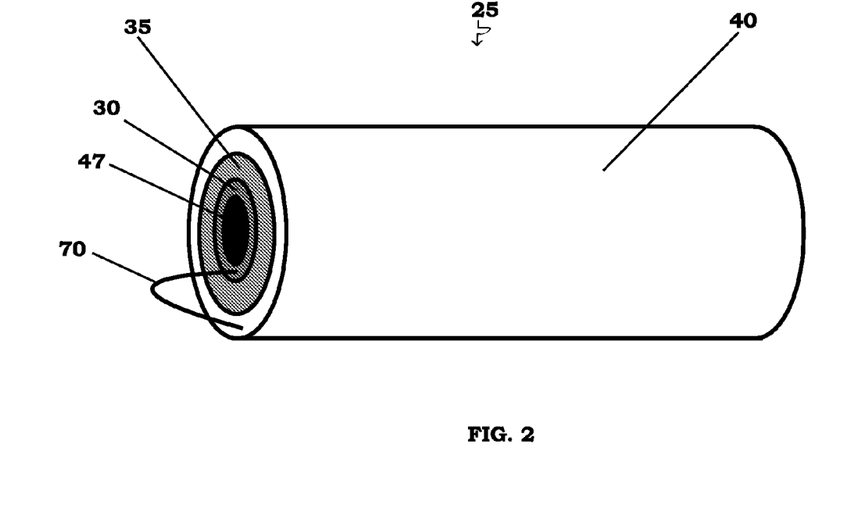
FIG. 2 is a side view of a cylindrical electro-catalytic oxidation device.

Although the ECOD may have any shape, a cylindrical shaped ECOD 25, as shown in FIG. 2, is preferred. FIG. 2 shows a cylindrical tube ECOD 25 having an ECOD anode 30, an ECOD electrolyte 35, and an ECOD cathode 40. The ECOD anode 30 is a cylindrical tube having an aperture 47, which allows the ECOD influent to pass through the ECOD anode 30. The ECOD anode 30 and ECOD cathode 40 are electrically connected, preferably by a wire 70.

The ECOD electrolyte 35 is preferably, a cylindrical tube, which is connected to and surrounds the ECOD anode 30. Likewise, the ECOD cathode 40 is a cylindrical tube, which is connected to and surrounds the ECOD electrolyte 35. A cylindrical shaped ECOD 25 maximizes the surface area to promote the reaction of coke buildup on the ECOD anode 30 with oxygen on the surface of the ECOD cathode 40. The ECOD can also be other geometrical shapes, such as planer, or a cylindrical shape having a rough surface.

In yet another alternative embodiment, an insert is placed in the space between ECOD anode 30 and the ECOD influent to generate flow turbulence and improve the gas phase-surface interaction. An example of such insert includes a spiral turbulator for the cylindrical shaped ECOD 25. Other designs of gas turbulators known in the art may also be used.

Figure 3:
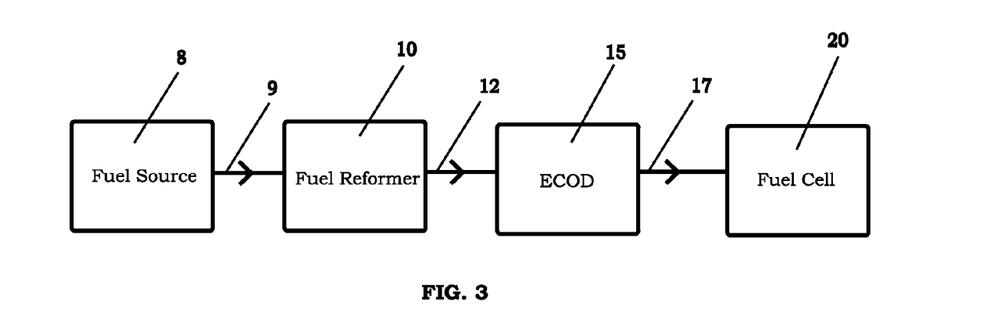
FIG. 3 is a block diagram showing a basic flow diagram of one embodiment of a fuel cell system utilizing the electro-catalytic oxidation device.

FIG. 3 shows an embodiment of a fuel cell system 5 utilizing an ECOD as described above, generally comprising a fuel source 8, a fuel channel 9, a fuel reformer 10, a reformate channel 12, an ECOD 15, an ECOD channel 17, and a fuel cell 20.

The fuel source 8, the fuel channel 9, the fuel reformer 10, the reformate channel 12, the ECOD channel 17, and the fuel cell 20 are further described in *Fuel Cell Handbook, 7th* ed. National Energy Technology Laboratory, 2004 (DOE/NETL-2004/1206) (OSTI ID: 834188), herein fully incorporated by reference.

Although only one ECOD 15 is shown in FIG. 3, any number of ECODs can be used. Multiple ECODs may be connected in series or parallel. For example, multiple ECODs can be connected in series to further minimize any coke forming contaminants within the ECOD effluent. Multiple ECODs may also be connected in parallel to minimize interference with fuel cell operation while coke buildup within an individual ECOD is removed, as in a preferred embodiment.

Fuel from the fuel source 8 is transferred from the fuel source 8 to the fuel reformer 10 via the fuel channel 9. The fuel reformer 10 converts the fuel catalytically or chemically into a reformate, a hydrogen rich gas. The reformate, also known as the ECOD influent, is transferred to the ECOD 15 via the reformate channel 12.

Preferably, the fuel source 8, fuel channel 9, the fuel reformer 10 or a combination thereof provide sufficient pressure to transport the fuel, in its various stages (reformate, ECOD effluent), through the fuel cell system 5. In the alternative, one or more pumps may be used to transfer the fuel, in its various stages, throughout the fuel cell system 5. Preferably, any pumps added to the fuel cell system 5, are placed within the appropriate channel (fuel channel 9, reformate channel 12, and ECOD channel 17).

The ECOD 15 removes carbonaceous contaminates by condensation and an electro-catalytic oxidation reaction. Meanwhile, the process generates electricity and an ECOD effluent which is free of carbonaceous contaminates. The ECOD effluent is passed to the fuel cell 20 via the ECOD channel 17. Finally, the fuel cell 20 generates electricity from the ECOD effluent. A coke buildup will not form within the fuel cell even if a heavy aromatic fuel, or a fuel having a high sulfur content is used as the fuel in the fuel source 8.

The fuel source 8 is capable of holding a fuel, and capable of transporting the fuel through the fuel channel 9 to the fuel reformer 10. In one embodiment, the fuel source 8 is a metal container having a pump able to produce a mist or vapor of fuel into the fuel channel 9. In the preferred embodiment, the fuel source 8 is a metal container, and the fuel channel 9 has or is a pump capable of producing a mist or vapor of fuel into the fuel reformer 10. The fuel can be any hydrocarbon fuel capable of being processed to generate a hydrogen rich reformate for use within a fuel cell. In a preferred embodiment, the fuel is diesel. In the alternative, multiple fuel sources, fuel channels, or combinations thereof may be used to supply a fuel or a plurality of fuels to the fuel reformer 10.

The fuel channel 9, reformate channel 12, and ECOD channel 17 are capable of containing the fuel in its various forms at different stages while transferring it to fuel reformer 10, ECOD 15, and fuel cell 20 respectively. The fuel channel 9 is preferably made of corrosion resistant metals, as those know in the field of the art. The reformate channel 12, ECOD channel 17 are each preferably made of high temperature metals, although other materials may be used such as a ceramic. In a preferred embodiment, the fuel channel 9 is made of stainless steel tubing; and the reformate channel 12 and the ECOD channel 17 are made of high temperature stainless steel tubes.

The fuel reformer 10 is capable of converting the hydrocarbon fuel into a hydrogen rich reformate suitable to be fed into the fuel cell 20 to generate electricity. Preferably, the fuel reformer 10 is a steam, a catalytic partial oxidation, a non-catalytic partial oxidation, or an autothermal reformer, described in *Fuel Cell Handbook, 7th* ed. National Energy Technology Laboratory, 2004 (DOE/NETL-2004/1206) (OSTI ID: 834188) pp (8-12)-(8-14) 2004 herein fully incorporated by reference. More preferably, the fuel reformer 10 is an autothermal reformer capable of reforming a preferred diesel fuel, such U.S. Pat. Nos. 5,993,619 and 5,935,010, or as described in *Fuel Cell Handbook, 7th* ed. National Energy Technology Laboratory, 2004 (DOE/NETL-2004/1206) (OSTI ID: 834188) pp (8-12)-(8-14) 2004 herein fully incorporated by reference. Generally in autothermal reforming, a substoichiometric amount of air or oxygen is used to partially oxidize the fuel and decompose it into the reformate, generally a mixture of hydrogen and carbon oxides such as CO and $CO_2$. This partial oxidation caused by the oxygen is highly exothermic, and can raise the reformer and reformate to a very high temperature. To balance the heat of partial oxidation, water or steam is often co-injected with the fuel into the reformer to initiate the endothermic steam reforming, which also produces hydrogen and carbon oxides with the hydrocarbon fuels. In a preferred application of autothermal reforming, the oxygen-to-carbon ratio, $O_2/C$ is maintained at about 0.3 to 0.5 and the steam-to-carbon ratio, $H_2O/C$ is maintained at about 1 to 6, although other ratios may be known to those skilled in the art. For fuel cell in transportation or remote power generation, $H_2O/C$ is generally maintained as low as possible in order to minimize the need for the onboard water storage.

A catalyst in the fuel reformer 10 facilitates the conversion of the fuel into the reformate by lowering the reaction potential of the fuel in the fuel reformer 10. The catalyst can be any material that promotes the conversion of the fuel into a reformate usable by the fuel cell 20. The reforming catalyst can be made of a dispersed transition metal such as Ni, Co, or noble metal such as Rh, Pt, Ru supported over the refractory oxides or exchanged into a perovskite support, combinations thereof, or based thereof. In a preferred embodiment, the catalyst is a perovskite material with rhodium or ruthenium exchanged into the B-site of the lattice. The result of the autothermal reforming can be a slightly exothermic process. For most heavy aromatic hydrocarbon fuels, including diesel, temperatures of about 500-1000° C. are used to reform the fuel. In a preferred embodiment, the fuel reformer 10 is an autothermal reformer using a rhodium or ruthenium exchanged perovskite catalyst and operated at about 700-800° C. In the alternative, multiple fuel reformers, reformate channels, or combinations thereof may be used to supply a reformate or a plurality of reformates to the ECOD 15, or a plurality of ECODs.

The fuel cell 20 is capable of generating electricity from the electrochemical reaction of hydrogen compounds with oxygen compounds such as described in U.S. Pat. No. 5,543,241 or the *Fuel Cell Handbook, 7th* ed. National Energy Technology Laboratory, 2004 (DOE/NETL-2004/1206) (OSTI ID: 834188) pp (3-1)-(7-49) 2004 herein fully incorporated by reference. Such fuel cells include, but are not limited to, polymer electrolyte, alkaline, phosphoric acid, molten carbonate, proton exchange membrane, and solid oxide fuel cells. The reformate or ECOD effluent both have hydrogen compounds capable of being used by the fuel cell 20 to generate electricity.

In a preferred embodiment, the fuel cell 20 is a solid oxide fuel cell (SOFC) such as described in U.S. Pat. No. 6,893,760 and the *Fuel Cell Handbook*, 7th ed. National Energy Technology Laboratory, 2004 (DOE/NETL-2004/1206) (OSTI ID: 834188) pp (7-1)-(7-49) 2004, herein fully incorporated by reference. The solid oxide fuel cell consists of an anode, an electrolyte, and a cathode. The SOFC anode is porous and chemically active to the electro-catalytic oxidation of hydrogen. Preferably, the SOFC anode is a cermet with a porous metal mixed with oxide ion conducting metal oxide, such as nickel mixed with $Y_2O_3$-stabilized $ZrO_2$ (YSZ), Co—$ZrO_2$ or $NiZrO_2$, although other anode materials may also be used. In a preferred embodiment, the SOFC anode is a mixture of nickel metal with $Y_2O_3$-stabilized $ZrO_2$ (YSZ). Early SOFCs required a temperature of about 1000° C., but improvements in the fuel cell electrolyte have lowered the temperature to about 700-900° C. In the alternative, multiple fuel cells may be used to generate electricity.

The SOFC electrolyte is non-porous and a conductor to oxide ions. Preferably, the SOFC electrolyte is nonporous $Y_2O_3$-stabilized $ZrO_2$(YSZ), Gadolinium-doped ceria, or lanthanum gallate with strontium doping. In a preferred embodiment, the SOFC electrolyte is YSZ.

The SOFC cathode promotes the electro-chemical reduction of oxygen to oxide ions. The SOFC cathode is preferably a lanthanum-based perovskite material such as $LaMnO_3$, or Sr-doped $LaMnO_3$. In a preferred embodiment, the fuel cell cathode is Sr-doped $LaMnO_3$.

Figure 4:
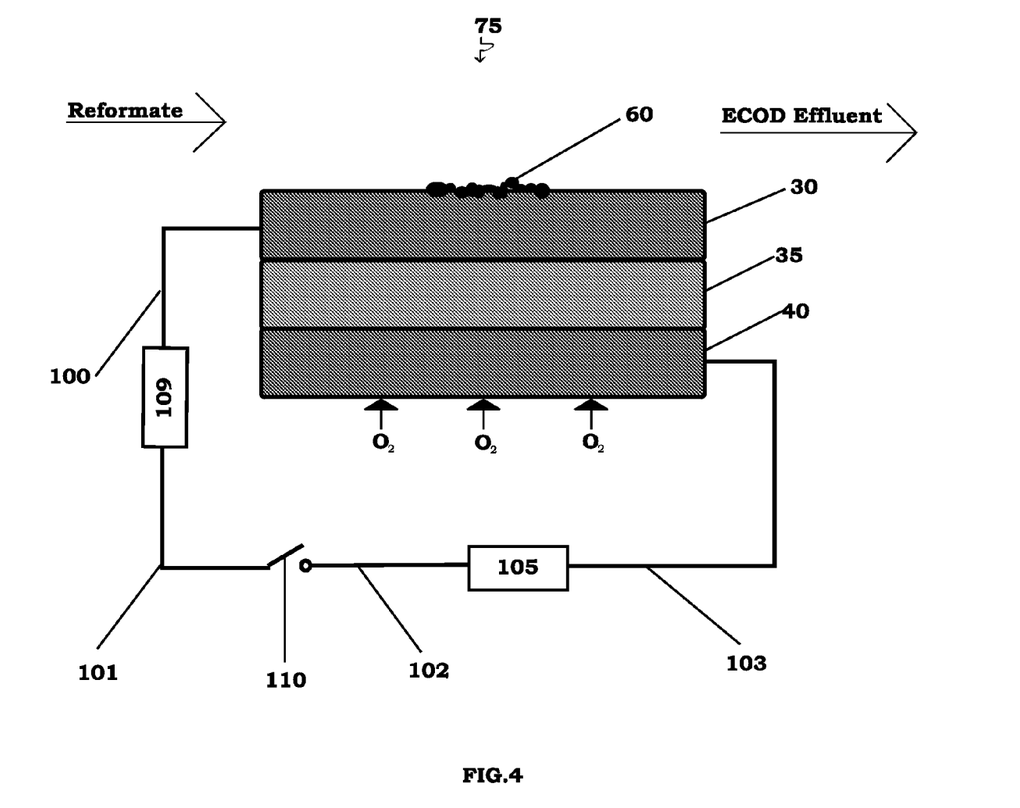
FIG. 4 is a cross-sectional view of a preferred embodiment of the electro-catalytic oxidation device.

In a preferred embodiment, the ECOD has a means for electrically connecting and disconnecting the ECOD anode and ECOD cathode. FIG. 4 shows a cross sectional view of a preferred embodiment of the ECOD 75 having a switch 110 to electrically connect the ECOD anode 30 and the ECOD cathode 40. As discussed above, the ECOD anode 30 and ECOD cathode 40 are separated by an ECOD electrolyte 35. In a preferred embodiment, the ECOD anode 30 and ECOD cathode 40 are electrically connected by wires (100,101,102, 103), a switch 110, a current sensor 109, and an energy storage device 105. The wires (100,101,102,103), switch 110, current sensor 109, and energy storage device 105 are connected in series. The wires (100,101,102,103) electrically connect the ECOD anode 30, the energy storage device 105, current sensor 109, and the ECOD cathode 40 when the switch 110 is in a closed position.

Therefore, the ECOD 75 to operates in two modes a trapping mode and a regeneration mode. In the trapping mode, the switch 110 is placed in an open position, whereby there is no electrical connection between the ECOD anode 30 and the ECOD cathode 40. Carbonaceous contaminates from the reformate will collect as a coke buildup 60 on the surface of the ECOD anode 30. In this mode, the coke buildup 60 will not react with $O_2$ on the surface of the ECOD cathode 40, nor will $CO_2$ be produced within the ECOD anode 30. No energy is generated and therefore no energy is collected by the energy storage device 105.

In the regeneration mode, the switch 110 is positioned in the closed position, creating an electrical circuit between the ECOD anode 30 and the ECOD cathode 40. While in the regeneration mode, oxide ions formed through Eq. 1 on the surface of ECOD cathode 40 will be driven by the electrochemical potential to migrate to the ECOD anode 30. Coke buildup 60 on the surface of the ECOD anode 30 during the trapping mode will be oxidized and form $CO_2$ with the oxide ions according to Eq. 2. Reformate flow through the ECOD 75 does not have to be suspended during the regeneration mode, therefore, the fuel cell will not have to be shutdown. However, some hydrogen may be consumed by the ECOD. Energy is generated by the overall electrochemical oxidation of carbon from the coke buildup 60 on the ECOD anode 30 with oxygen at the ECOD cathode 40 surface. The generated energy will be collected by the energy storage device 105. Once the coke buildup 60 is depleted, the ECOD 75 preferably enters the trapping mode to prevent further consumption of hydrogen by opening the electric circuit between the ECOD anode 30 and ECOD cathode 40 of the ECOD 75, preferably by placing the switch 110 in the open position.

Preferably, the switch 110 is periodically switched to remove the coke buildup 60 while minimizing the consumption of hydrogen from the reformate by the ECOD 75. The periodical switching can be operated at variable frequencies. The frequency of switching is highly dependent on the type of the fuel, the amount of the fuel being processed and the reformer operating parameters. The operating parameters directly related to the switching frequency include the reforming temperature, $O_2$/C ratio, $H_2O$/C ratio, etc. Generally, higher reforming temperatures, higher $O_2$/C and $H_2O$/C ratios will lead to a lower switching frequency, and vice versa. In addition, the switching frequency also depends on the fuel processing rate determined by fuel cell fuel consumption and the ratio of the size of the fuel cell and the size of the ECOD 75. For the economical reasons, the size of the ECOD 75 should be a fraction of the size of the fuel cell in terms of the active electrochemical surface area. In a preferred embodiment, utilizing a SOFC, the ECOD 75 is about 1/10 the size of the fuel cell and the switch 110 is closed about once every 20 seconds. Alternatively, the size of the ECOD 75 can be reduced if the switch 110 is closed more frequently.

Alternately, the regeneration of ECOD 75 is determined by analyzing the change in electrical current between ECOD anode 30 and ECOD cathode 40 as a function of time through the current sensor 109 when the switch 110 is in the closed position. In this embodiment, the switch 110 is periodically placed in the closed position, placing the ECOD 75 in the regeneration mode. The oxidation of coke generally has slower rate, generating less electrical current, in comparison with oxidation of reformate. Once the coke buildup 60 has been depleted the ECOD anode 30 will be exposed to the reformate, therefore an increase in current between the ECOD anode 30 and ECOD cathode 40 can be detected signaling that hydrogen is being consumed. Once hydrogen begins to be consumed the switch 110 is placed in the open position, placing the ECOD 75 in the trapping mode to prevent further consumption of hydrogen.

The wires (100,101,102,103) are any electrically conductive material, preferably, a copper wire. The switch 110 is a device having at least two states, an electrically conductive state (closed position), and an electrically insulating state (open position). Ideally, the switch 110 has a low internal resistance. The switch 110 is preferably a rocker switch, toggle switch, or push button single pole-single-throw switch. In the alternative, the switch 110 may be electrically controlled, such as a relay, BJT transistor, MOSFET transistor, JFET transistor, IGFET (MOSFET) transistor, IGBT transistor, and combinations thereof. In a preferred embodiment, a relay switch is used to electrically connect the ECOD anode 30 and the ECOD cathode 40 of the ECOD 75.

The energy storage device 105 may be any device capable of storing and releasing the electrical energy, such as a battery, a supercapacitor, and combinations therefore. Preferably, the energy stored in the storage device 105 is released during the ECOD 75 trapping mode so that the energy storage device 105 will not be saturated during the regeneration mode. In a preferred embodiment, the generated energy is aggregated to the energy production of the fuel cell. The energy storage device 105 may also be a simple wire, foregoing the use of energy produced by the ECOD 75.

The current sensor 109 may be any device capable of detecting electrical current. Preferably by the use of one or more volt meters, shunt resistors, current probes, or other methods known in the art.

A fuel cell system utilizing a plurality of the ECOD 75 can preferably process incoming reformate in a concurrent mode or alternating mode. In the concurrent mode, the reformate is preferably processed by a plurality of the ECODs in series or in parallel, further minimizing coke producing compounds from entering the fuel cell. In the alternating mode, the incoming reformate is preferably redirected to a parallel ECOD while the ECOD having the coke buildup 60 is isolated from the reformate flow and placed in the regeneration mode. In the alternating mode, the regeneration step is self-extinguished when the coke buildup 60 is consumed which minimizes the potential parasitic consumption of hydrogen and CO in the reformate.

Figure 5:
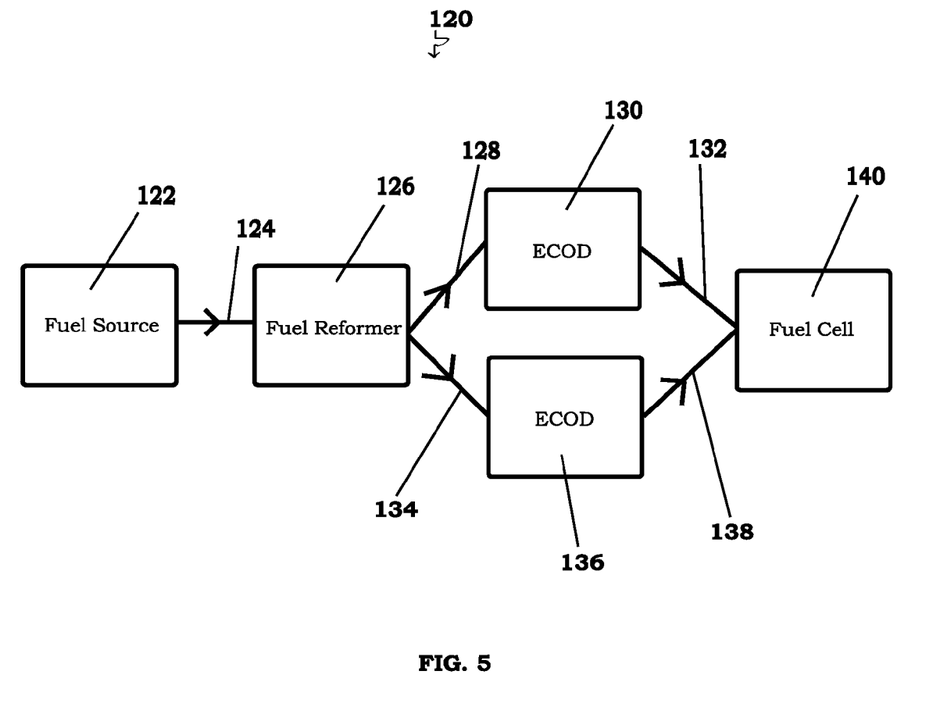
FIG. 5 is a block diagram of a preferred fuel cell system utilizing two electro-catalytic oxidation devices.

FIG. 5 shows a preferred fuel cell system 120 utilizing a plurality of the ECOD 75 shown in FIG. 4, generally comprising a fuel source 122, a fuel channel 124, a fuel reformer 126, a first reformate channel 128, a first ECOD 130, a first ECOD channel 132, a second reformate channel 134, a second ECOD 136, a second ECOD channel 138, and a fuel cell 140. The fuel source 122 is connected to the fuel reformer 126 by the fuel channel 124. The fuel reformer 126 is connected to the first ECOD 130 by the first reformate channel 128. The first ECOD 130 is connected to the fuel cell 140 by the first ECOD channel 132. Likewise, the second ECOD 136 is connected to the fuel reformer 126 by the second reformate channel 134, and connected to the fuel cell 140 by the second ECOD channel 138.

In the alternating mode, the reformate is preferably passed only through an ECOD in the trapping mode. Since the reformate is isolated from the ECOD in the regeneration mode, parasitic losses of hydrogen and carbon monoxide are kept at a minimum while any coke buildup is completely removed. Preferably, the reformate is restricted by valves placed at the entrance or the exit of the first ECOD 130, the second ECOD 136, the first reformate channel 128, the first ECOD channel 132, the second reformate channel 134, the second ECOD channel 138, or combinations thereof.

In a preferred embodiment, a 4-way crossover valve is used to direct the reformate to either the first ECOD 130, or the second ECOD 136. When the valve is positioned to flow the reformate through the first ECOD 130, the first ECOD 130 is put in the trapping mode, and the second ECOD 136 is put in the regeneration mode. After a period sufficient to remove the coke buildup saturated over the ECOD anode of the second ECOD 136, the valve is switched to flow the reformate through the second ECOD 136, and similarly the first ECOD 130 is put in the regeneration mode, and the second ECOD 136 is put in the trapping mode.

The current sensor 109 may be used to detect the change in current generated from the breakdown of the coke buildup within an ECOD in regeneration mode. When the coke buildup has been depleted a significant loss in current produced by the ECOD can be detected. The detection of this decrease in current will trigger the valve to change the ECOD from regeneration to trapping mode while swapping the other ECOD from trapping to regeneration mode.

Although the ECOD described above is utilized only in a fuel cell system, the ECOD may be utilized to remove a contaminant in any gas stream capable of electro-catalytic oxidation. It is to be understood that the above described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

What is claimed is:

1. A fuel cell system comprising:
    a fuel source means for supplying a fuel;
    a fuel reformer means for reforming said fuel into a reformate;
    a means for transferring said fuel from said fuel source means to said fuel reformer means;
    a fuel cell comprising an anode;
    one or more electro-catalytic oxidation devices (ECOD) whereby each ECOD comprises an ECOD anode, an ECOD cathode, and an ECOD electrolyte whereby:
        said ECOD anode has a first and second end, and is porous and chemically active to the electro-catalytic oxidation of carbon;
        said ECOD anode creates an ECOD effluent;
        said first end of said ECOD anode is connected to said fuel reformer means whereby said reformate is transferred from said fuel reformer means to said ECOD anode;
        said second end of said ECOD anode is connected to said fuel cell whereby said ECOD effluent is transferred to said anode of said fuel cell;
        said ECOD electrolyte is positioned between and in ionic contact with said ECOD anode and said ECOD cathode;
    a means for electrically connecting said ECOD anode and said ECOD cathode; and
    a means for maintaining the temperature of said ECOD anode between about 400° C. and 650° C.

2. The fuel cell system of claim 1 whereby said ECOD anode has a cylindrical shape having a central aperture running the length of said ECOD anode.

3. The fuel cell system of claim 1 whereby said fuel cell is a solid-oxide fuel cell.

4. The fuel cell system of claim 1 whereby said reformer means is selected from the group of reformers consisting of an autothermal reformer, a steam reformer and a partial-oxidation reformer.

5. The fuel cell system of claim 1 whereby said means for electrically connecting said ECOD anode and said ECOD cathode is a wire electrically connected to said ECOD anode and said ECOD cathode.

6. The fuel cell system of claim 1 whereby said means for electrically connecting said ECOD anode and said ECOD cathode comprises an electrical switch electrically connected to said ECOD anode and said ECOD cathode.

7. The fuel cell system of claim 1 whereby said fuel reformer means is a device having a means for processing diesel fuel into hydrogen.

8. The fuel cell system of claim 1 whereby said means for maintaining the temperature of said ECOD anode comprises a means for maintaining the temperature of said ECOD anode between about 500° C. and 600° C.

9. The fuel cell system of claim 1 further comprising a means for directing the transfer of reformate to an electro-catalytic oxidation device from said one or more electro-catalytic oxidation devices.

10. The fuel cell system of claim 1 whereby said ECOD effluent is free of carbonaceous contaminants.

11. A method of generating electricity comprising the steps of:
reforming a fuel into a reformate, said reformate comprising hydrogen and carbonaceous contaminants;
removing said carbonaceous contaminants from said reformate with one or more of the electro-catalytic oxide devices (ECOD) described in claim 1 creating an ECOD effluent; and
generating electricity from said ECOD effluent using a fuel cell.

12. A fuel cell system comprising:
a fuel source means for supplying a fuel;
a fuel reformer means for reforming said fuel into a reformate;
a means for transferring said fuel from said fuel source means to said fuel reformer means;
a fuel cell comprising an anode;
one or more electro-catalytic oxidation devices (ECOD) whereby each ECOD comprises an ECOD anode, an ECOD cathode, and an ECOD electrolyte whereby:
said ECOD anode has a first and second end, and is porous and chemically active to the electro-catalytic oxidation of carbon;
said ECOD anode creates an ECOD effluent;
said first end of said ECOD anode is connected to said fuel reformer means whereby said reformate is transferred from said fuel reformer means to said ECOD anode;
said second end of said ECOD anode is connected to said fuel cell whereby said ECOD effluent is transferred to said anode of said fuel cell;
said ECOD electrolyte is positioned between and in ionic contact with said ECOD anode and said ECOD cathode;
a means for electrically connecting said ECOD anode and said ECOD cathode; and
said ECOD anode is nickel and gadolinium doped cerium oxide mixture.

13. A fuel cell system comprising:
a fuel source means for supplying a fuel;
a fuel reformer means for reforming said fuel into a reformate;
a means for transferring said fuel from said fuel source means to said fuel reformer means;
a fuel cell comprising an anode;
one or more electro-catalytic oxidation devices (ECOD) whereby each ECOD comprises an ECOD anode, an ECOD cathode, and an ECOD electrolyte whereby:
said ECOD anode has a first and second end, and is porous and chemically active to the electro-catalytic oxidation of carbon;
said ECOD anode creates an ECOD effluent;
said first end of said ECOD anode is connected to said fuel reformer means whereby said reformate is transferred from said fuel reformer means to said ECOD anode;
said second end of said ECOD anode is connected to said fuel cell whereby said ECOD effluent is transferred to said anode of said fuel cell;
said ECOD electrolyte is positioned between and in ionic contact with said ECOD anode and said ECOD cathode;
a means for electrically connecting said ECOD anode and said ECOD cathode; and
said ECOD cathode is a material selected from the group consisting of Ag—CGO, $Y_{0.25}Bi_{0.75}O_{1.5}$, $Sm_{0.5}Sr_{0.5}CoO_{3-\delta}$, and combinations thereof.

14. A fuel cell system comprising:
a fuel source means for supplying a fuel;
a fuel reformer means for reforming said fuel into a reformate;
a means for transferring said fuel from said fuel source means to said fuel reformer means;
a fuel cell comprising an anode;
one or more electro-catalytic oxidation devices (ECOD) whereby each ECOD comprises an ECOD anode, an ECOD cathode, and an ECOD electrolyte whereby:
said ECOD anode has a first and second end, and is porous and chemically active to the electro-catalytic oxidation of carbon;
said ECOD anode creates an ECOD effluent;
said first end of said ECOD anode is connected to said fuel reformer means whereby said reformate is transferred from said fuel reformer means to said ECOD anode;
said second end of said ECOD anode is connected to said fuel cell whereby said ECOD effluent is transferred to said anode of said fuel cell;
said ECOD electrolyte is positioned between and in ionic contact with said ECOD anode and said ECOD cathode;
a means for electrically connecting said ECOD anode and said ECOD cathode; and
said ECOD electrolyte is gadolinium doped cerium oxide or cerium oxide.

15. The fuel cell system of claim 14 whereby said ECOD electrolyte is gadolinium doped cerium oxide.

16. A method removing carbon from an influent gas comprising the steps of:
providing one or more electro-catalytic oxidation devices (ECOD) whereby each ECOD comprises an ECOD anode, an ECOD cathode, and an ECOD electrolyte whereby:
said ECOD anode has a first and second end, and is porous and chemically active to the electro-catalytic oxidation of carbon;
said ECOD anode creates an ECOD effluent;
said first end of said ECOD anode is connected to said fuel reformer means whereby said reformate is transferred from said fuel reformer means to said ECOD anode;
said second end of said ECOD anode is connected to said fuel cell whereby said ECOD effluent is transferred to said anode of said fuel cell;
said ECOD electrolyte is positioned between and in ionic contact with said ECOD anode and said ECOD cathode;
passing said influent across said ECOD anode; and
cooling said influent so as to promote the condensation of said carbon on said ECOD anode.

17. The method of removing carbon from an influent gas of claim 16 whereby said ECOD anode is nickel and gadolinium doped cerium oxide mixture.

18. The method of removing carbon from an influent gas of claim 16 whereby said ECOD cathode is a material selected from the group consisting of Ag—CGO, $Y_{0.25}Bi_{0.75}O_{1.5}$, $Sm_{0.5}Sr_{0.5}CoO_{3-\delta}$, and combinations thereof.

19. The method of removing carbon from an influent gas of claim 16 whereby said ECOD electrolyte is gadolinium doped cerium oxide or cerium oxide.

20. A fuel cell system comprising:
- a fuel source means for supplying a fuel;
- a fuel reformer means for reforming said fuel into a reformate;
- a means for transferring said fuel from said fuel source means to said fuel reformer means;
- an electro-catalytic oxidation means for removing carbon from said reformate creating an ECOD effluent;
- a means for maintaining the temperature of said ECOD anode between about 400° C. and 650° C.;
- a means for transferring said reformate to said electro-catalytic oxidation means;
- a fuel cell means for generating electricity from said ECOD effluent; and
- a means for transferring said ECOD effluent to said fuel cell means.

* * * * *